United States Patent
Ng et al.

(10) Patent No.: US 9,642,225 B1
(45) Date of Patent: May 2, 2017

(54) VOICE-CONTROLLED LIGHTING CONTROL SYSTEM

(71) Applicants: Kai-Kong Ng, Hong Kong (CN); Ming-Yao Chiang, Pingtung County (TW); Richard Lence, Charleston, SC (US)

(72) Inventors: Kai-Kong Ng, Hong Kong (CN); Ming-Yao Chiang, Pingtung County (TW); Richard Lence, Charleston, SC (US)

(*) Notice: Subject to any disclaimer, the term of this patent is extended or adjusted under 35 U.S.C. 154(b) by 0 days.

(21) Appl. No.: 15/298,479

(22) Filed: Oct. 20, 2016

(51) Int. Cl.
| | |
|---|---|
| *H05B 37/02* | (2006.01) |
| *G10L 15/22* | (2006.01) |
| *G10L 25/51* | (2013.01) |
| *G10L 17/06* | (2013.01) |
| *G10L 15/32* | (2013.01) |
| *H05B 33/08* | (2006.01) |
| *F21S 4/10* | (2016.01) |
| *F21W 121/04* | (2006.01) |
| *F21Y 115/10* | (2016.01) |

(52) U.S. Cl.
CPC .......... *H05B 37/0272* (2013.01); *G10L 15/22* (2013.01); *G10L 15/32* (2013.01); *G10L 17/06* (2013.01); *G10L 25/51* (2013.01); *H05B 33/0845* (2013.01); *H05B 37/0227* (2013.01); *F21S 4/10* (2016.01); *F21W 2121/04* (2013.01); *F21Y 2115/10* (2016.08); *G10L 2015/223* (2013.01)

(58) Field of Classification Search
CPC ......... G10L 15/22; G10L 15/32; G10L 17/06; G10L 25/51; H05B 37/0272; H05B 37/0227; H05B 33/0845
See application file for complete search history.

(56) References Cited

U.S. PATENT DOCUMENTS

| | | | |
|---|---|---|---|
| 2016/0120009 A1* | 4/2016 | Aliakseyeu | H05B 37/0272 315/131 |
| 2016/0224315 A1* | 8/2016 | Zhang | G10L 15/26 |
| 2016/0249437 A1* | 8/2016 | Sun | H05B 37/0227 |
| 2016/0284350 A1* | 9/2016 | Yun | G10L 15/22 |

* cited by examiner

*Primary Examiner* — Douglas W Owens
*Assistant Examiner* — Pedro C Fernandez
(74) *Attorney, Agent, or Firm* — Muncy, Geissler, Olds & Lowe, P.C.

(57) ABSTRACT

A voice-controlled lighting control system includes a voice-processing device, a lighting control device and a lighting module. The lighting control device is connected to the voice-processing device and the lighting module. The voice-processing device is built in with multiple voice fingerprints and multiple error-tolerant voice fingerprints. During operation, users utter a voice command to the voice-processing device, the voice-processing device compares the received voice command with the voice fingerprints or the error-tolerant voice fingerprints, and sends a control signal to the lighting control device to instruct the lighting module to emit light when finding that the voice command falls within a biometric match threshold of one of the voice fingerprints or the error-tolerant fingerprints. Given the double voice recognition using the voice fingerprints and the error-tolerant voice fingerprints, the precision in recognizing the voice command is enhanced and voice control over lighting can be achieved.

28 Claims, 4 Drawing Sheets

VOICE-CONTROLLED LIGHTING CONTROL SYSTEM

BACKGROUND OF THE INVENTION

1. Field of the Invention

The present invention relates to a lighting control system and, more particularly, to a voice-controlled lighting control system.

2. Description of the Related Art

People gather together to celebrate certain seasonal parties, such as Christmas party, thereby making friendly contact and recreating and relaxing themselves. To create sizzling atmosphere of the Christmas party, lighting effect certainly plays a critical role.

Luminance and lighting modes of one type of conventional Christmas lights can be controlled through a switch. However, users must approach the switch of the type of conventional Christmas lights before the luminance and lighting modes can be adjusted. Under certain circumstances, the position of the switch is not convenient to reach and thus restricts people from changing the luminance and lighting modes of the conventional Christmas lights at will. Such imperfection sometimes may spoil the atmosphere of the party.

Another type of conventional Christmas lights is turned on or off depending on loudness of voice command. However, such turn-on or turn-off operation is susceptible to surrounding sound and/or voice and is not effectively controllable over the type of conventional Christmas lights. For the sake of effective control over the type of Christmas lights, if loudness of the voice commands increases, it generates unexpected noise to the party. On the other hand, if loudness of the voice commands decreases, it can only turn on or off the type of Christmas lights but the tradeoff is that it fails to control the lighting modes of the Christmas lights.

SUMMARY OF THE INVENTION

An objective of the present invention is to provide a voice-controlled lighting control system ensuring that when users utter a voice command for control over a light, the voice command can be recognized through double voice recognition means to enhance precision in recognizing the voice command, and luminance and lighting modes of the light can be controlled by the recognized voice command.

To achieve the foregoing objective, the voice-controlled lighting control system includes a voice-processing device, a lighting control device and a lighting module.

The voice-processing device has a memory unit, a first communication unit, a first power module, a voice-receiving module and a first processor.

The memory unit is initially built in with multiple voice fingerprints and multiple error-tolerant voice fingerprints. Each voice fingerprint corresponds to one of the multiple error-tolerant voice fingerprints.

The first processor is connected to the first power module, the voice-receiving module, the memory unit and the first communication unit.

The lighting control device has a second communication unit, a second power module, a driving module and a second processor.

The second communication unit is connected to and communicates with the first communication unit.

The second processor is connected to the second power module, the driving module and the second communication unit.

The lighting module is connected to the driving module of the lighting control device.

The voice-receiving module of the voice-processing device receives a voice command. The first processor compares the received voice command with the voice fingerprints stored in the memory unit, if the received voice command falls within a biometric match threshold of one of the voice fingerprints stored in the memory unit, the first processor sends a corresponding control signal to the second communication unit of the lighting control device through the first communication unit, the second processor of the lighting control device sends a corresponding driving signal according to the corresponding control signal to the driving module, and the driving module drives the lighting module to operate according to the corresponding driving signal.

If the voice command does not fall within the biometric match threshold of any of the voice fingerprints stored in the memory unit, the first processor compares the received voice command with the error-tolerant voice fingerprints stored in the memory unit.

If the received voice command falls within a biometric match threshold of one of the error-tolerant voice fingerprints, the first processor sends a corresponding control signal to the second communication unit of the lighting control device through the first communication unit, the second processor of the lighting control device sends a corresponding driving signal according to the control signal to the driving module, and the driving module drives the lighting module to operate according to the driving signal.

The biometric match threshold of each error-tolerant voice fingerprint is greater than the biometric match threshold of a corresponding voice fingerprint stored in the memory unit.

Given the foregoing voice-controlled lighting control system, after receiving a voice command from a user, the voice-processing device compares the voice command with the voice fingerprints, if the voice command falls within the biometric match threshold of one of the voice fingerprints, the voice-processing device sends a corresponding control signal to the lighting control device to instruct the lighting module to emit light, and if the voice command fails to fall within the biometric match threshold of any voice fingerprint, the voice-processing device further compares the voice command with the error-tolerant voice fingerprints, and if the voice command falls within the biometric match threshold of one of the error-tolerant voice fingerprints, the voice-processing device sends the corresponding control signal to the lighting control device to instruct the lighting module to emit light. Such double voice recognition means enhances precision in recognizing the voice command, such that luminance and lighting modes of the light can be controlled through the double voice recognition means.

Other objectives, advantages and novel features of the invention will become more apparent from the following detailed description when taken in conjunction with the accompanying drawings.

DETAILED DESCRIPTION OF THE INVENTION

Figure 1:
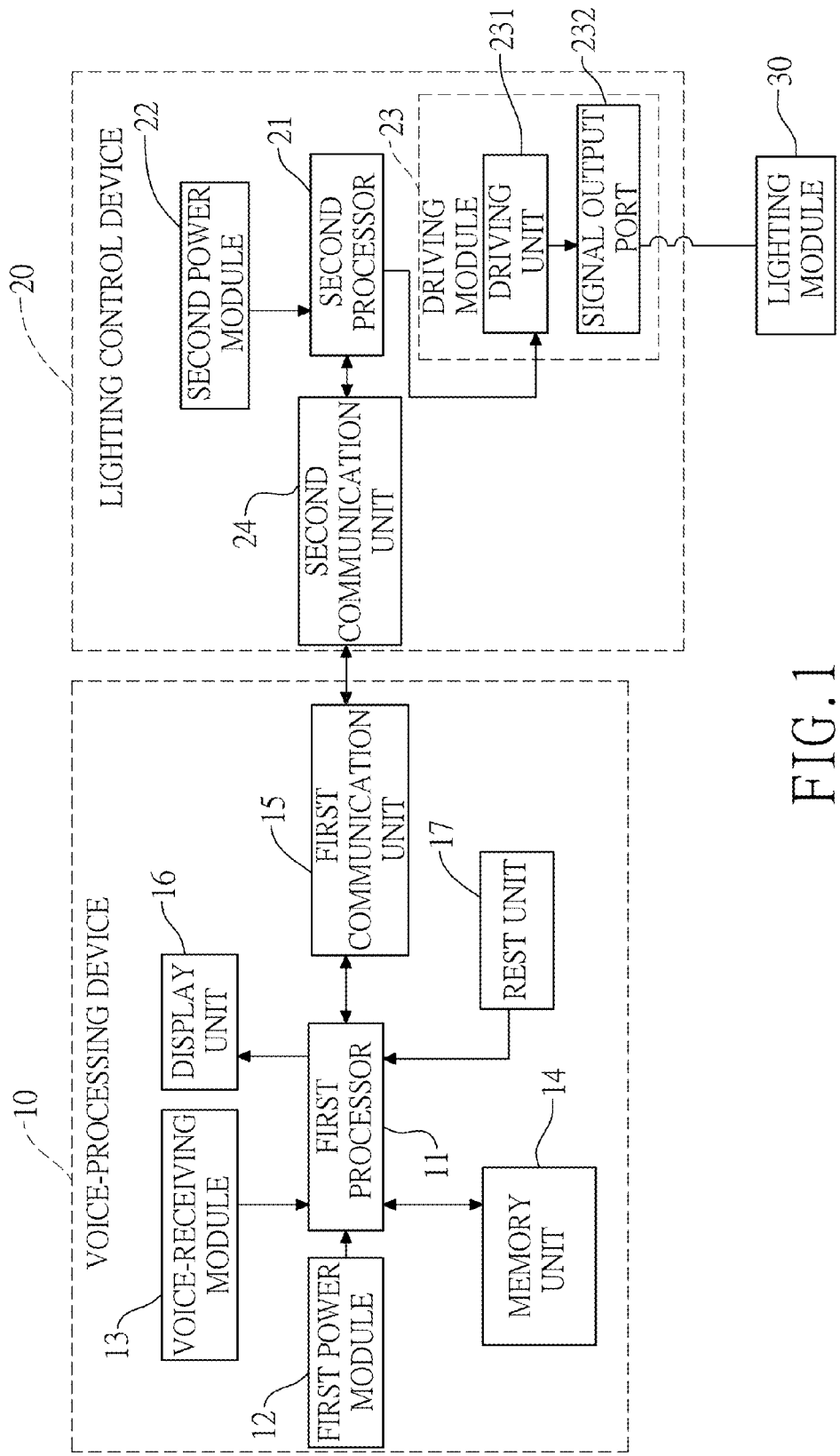
FIG. 1 is a functional block diagram of a first embodiment of a voice-controlled lighting control system in accordance with the present invention.
Figure 2:
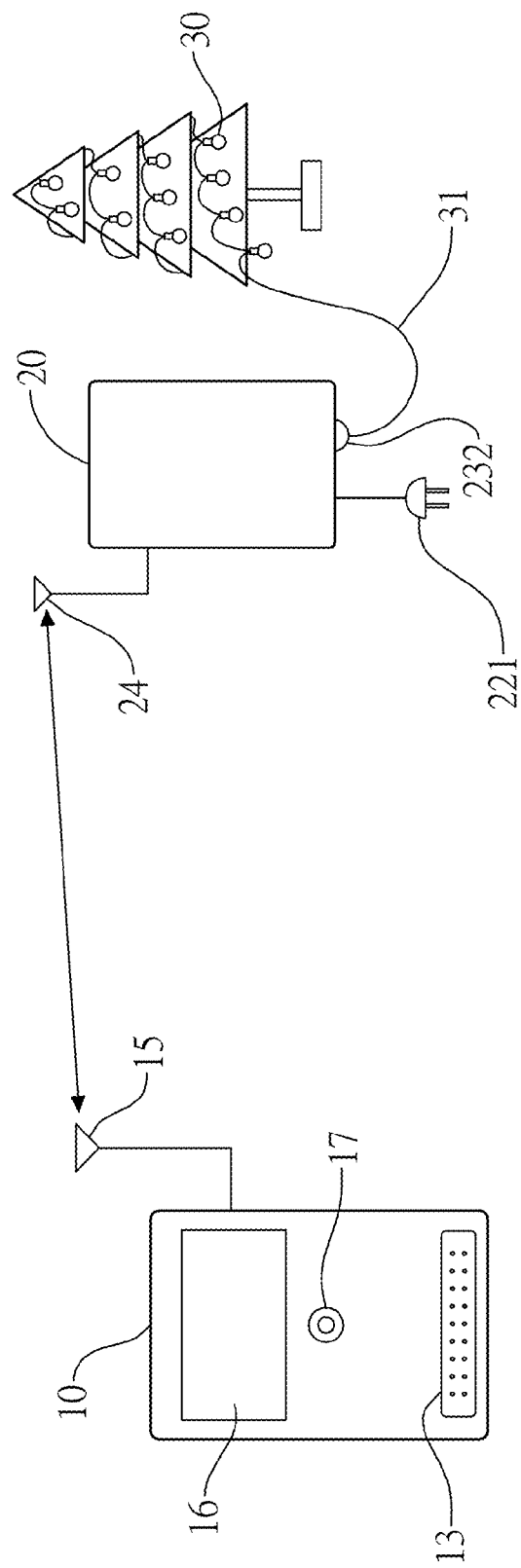
FIG. 2 is an operational schematic diagram of the voice-controlled lighting control system in FIG. 1.

With reference to FIGS. 1 and 2, a first embodiment of a voice-controlled lighting control system in accordance with the present invention includes a voice-processing device 10, a lighting control device 20 and a lighting module 30. The voice-processing device 10 is connected to and communicates with the lighting control device 20. In the present embodiment, the lighting module 30 has a power cable 31 and is electrically connected to the lighting control device 20 through the power cable 31.

The voice-processing device 10 has a first processor 11, a first power module 12, a voice-receiving module 13, a memory unit 14 and a first communication unit 15. The first processor 11 is electrically connected to the first power module 12, the voice-receiving module 13, the memory unit 14 and the first communication unit 15.

The voice-receiving module 13 serves to receive a voice command for luminance adjustment, power on or off, or blinking and the like, and sends the received voice command to the first processor 11. The voice-receiving module 13 may be a noise-cancelling voice receiver.

The memory unit 14 is built in with multiple voice fingerprints and multiple error-tolerant voice fingerprints. The multiple voice fingerprints have multiple biometric match thresholds for voice commands uttered by people of different ages, genders and nationalities. Besides, as everyone has his/her own acoustic fingerprint, the multiple error-tolerant voice fingerprints are dedicated to correspond to the multiple voice fingerprints and have biometric match thresholds doubling the biometric match thresholds of the corresponding voice fingerprints to provide wider ranges of biometric match thresholds and higher recognition success rate for people with different acoustic fingerprints.

The voice-processing device 10 further has a display unit 16. The display unit 16 is connected to the first processor 11. When receiving power supplied from the first power module 12, the first processor 11 sends a standby state prompting signal to the display unit 16 for the display unit 16 to display a notification that the voice-processing device 10 is staying at a standby state. Thus, users are aware that the voice-processing device 10 is powered on and available for operation. In the present embodiment, the display unit 16 is a display.

The lighting control device 20 has a second processor 21, a second power module 22, a driving module 23 and a second communication unit 24. The second processor 21 is electrically connected to the second power module 22, the driving module 23 and the second communication unit 24. The second communication unit 24 is connected to the first communication unit 15. In the present embodiment, the second power module 22 is a power adapter with a power cable 221 connected to and receiving mains power.

The driving module 23 has a driving unit 231 and a signal output port 232. The driving unit 231 is connected to the second processor 21 and the signal output port 232. The signal output port 232 is connected to the power cable 31 of the lighting module 30. The driving unit 231 sends a driving signal outputted from the second processor 21 along with a power signal to the lighting module 30 through the signal output port 232 to drive the lighting module 30 to change a lighting mode of the lighting module 30, or turn on/off the lighting module 30. In the present embodiment, the lighting module 30 is a Christmas string light composed of the power cable 31 and multiple light-emitting diodes (LEDs).

When the voice-controlled lighting control system is in operation, users utter a voice command to the voice-receiving module 13 of the voice-processing device 10, the voice-receiving module 13 of the voice-processing device 10 transmits the received voice command to the first processor 11, the first processor 11 compares the received voice command with the multiple voice fingerprints stored in the memory unit 14, when the received voice command falls within the biometric match threshold of one of the voice fingerprints stored in the memory unit 14, the first processor 11 of the voice-processing device 10 generates a corresponding control signal and transmits the corresponding control signal to the second communication unit 24 of the lighting control device 20 through the first communication unit 15, the second processor 21 of the lighting control device 20 processes the control signal and transmits a corresponding driving signal to the driving unit 231 of the driving module 23, and the driving unit 231 further transmits the received driving signal along with a power signal to the lighting module 30 through the signal output port 232 to drive the lighting module 30 to perform a corresponding operation.

When comparing the received voice command with the voice fingerprints stored in the memory unit 14 and finding that the received voice command does not fall within the biometric match threshold of any voice fingerprint in the memory unit 14, the first processor 11 further compares the received voice command with the error-tolerant voice fingerprints stored in the memory unit 14. When finding that the received voice command falls within the biometric match threshold of one of the error-tolerant voice fingerprints in the memory unit 14, the first processor 11 generates a corresponding control signal and transmits the corresponding control signal to the second communication unit 24 of the lighting control device 20 through the first communication unit 15. The second processor 31 of the lighting control device 20 processes the received control signal and transmits a corresponding driving signal to the driving unit 231 of the driving module 23. The driving unit 231 further transmits the received driving signal along with a power signal to the lighting module 30 through the signal output port 232 to drive the lighting module 30 to perform a corresponding operation.

When the first processor 11 compares the received voice command with the multiple voice fingerprints stored in the memory unit 14 and further compares the received voice command with the multiple error-tolerant voice fingerprints, an error-tolerant voice fingerprint with the biometric match threshold within which the received voice command falls replaces a corresponding voice fingerprint stored in the memory unit 14 to enhance precision of the voice-processing device 10 in recognizing the received voice command and attain a command learning effect.

When the first processor 11 compares the received voice command with the voice fingerprints and the error-tolerant voice fingerprints stored in the memory unit 14 and finds no match, the voice-processing device 10 is idle and performs no operation at all.

When comparing the received voice command with the voice fingerprints and the error-tolerant voice fingerprints stored in the memory unit 14, the first processor 11 simultaneously transmits a busy signal to the display unit 16 for the display unit 16 to display a system busy notification for users to know that the voice-processing device 10 is recognizing the received voice command.

The voice-processing device 10 further has a reset unit 17. The reset unit 17 is connected to the first processor 11. When receiving a reset signal outputted from the reset unit 17, the first processor 11 restores a voice fingerprint replaced by a corresponding error-tolerant voice fingerprint to an initial state according to the reset signal. In the present embodiment, the reset unit 17 is a reset button.

Figure 3:
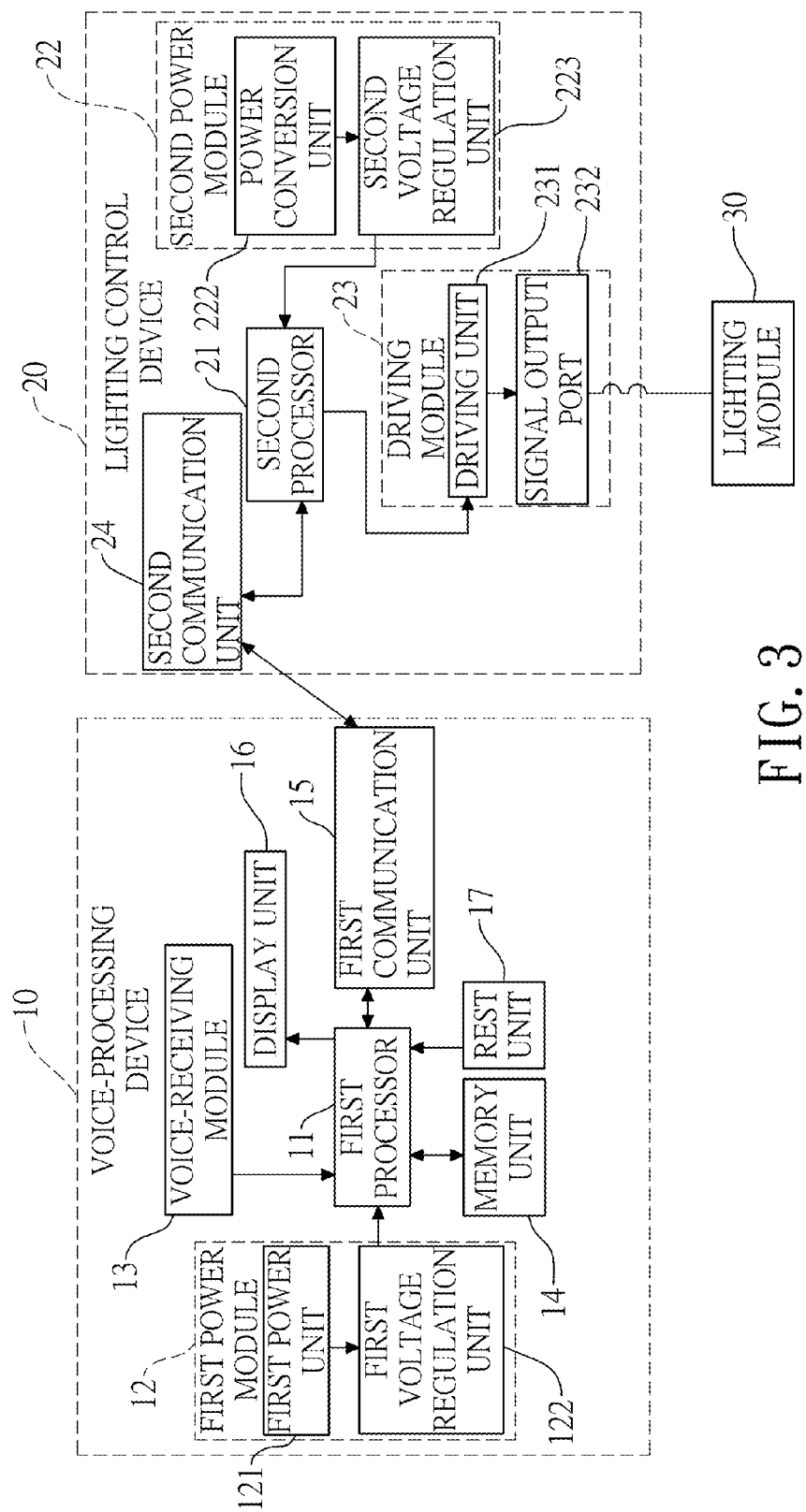
FIG. 3 is a functional block diagram of a second embodiment of a voice-controlled lighting control system in accordance with the present invention.

With reference to FIG. 3, a second embodiment of a voice-controlled lighting control system in accordance with the present invention is substantially the same as the first embodiment except that the first power module 12 of the voice-processing device 10 and the second power module 22 of the lighting control device 20 differ from those in the first embodiment.

The first power module 12 of the voice-processing device 10 has a first power unit 121 and a first voltage regulation unit 122. The first voltage regulation unit 122 is electrically connected to the first power unit 121 and the first processor 11. The first power unit 121 includes multiple 1.5V battery cells. The first voltage regulation unit 122 regulates the voltage of power supplied from the first power unit 121 and supplies power with less voltage drop to the first processor 11.

The second power module 22 of the lighting control device 20 has a power conversion unit 222 and a second voltage regulation unit 223. The second voltage regulation unit 223 is electrically connected to the power conversion unit 222 and the second processor 21. The power conversion unit 222 serves to convert mains power into 29V DC (Direct Current) power. The second voltage regulation unit 223 serves to regulate the voltage of the 29V DC power converted by the power conversion unit 222 to supply power with less voltage drop to the second processor 21.

Figure 4:
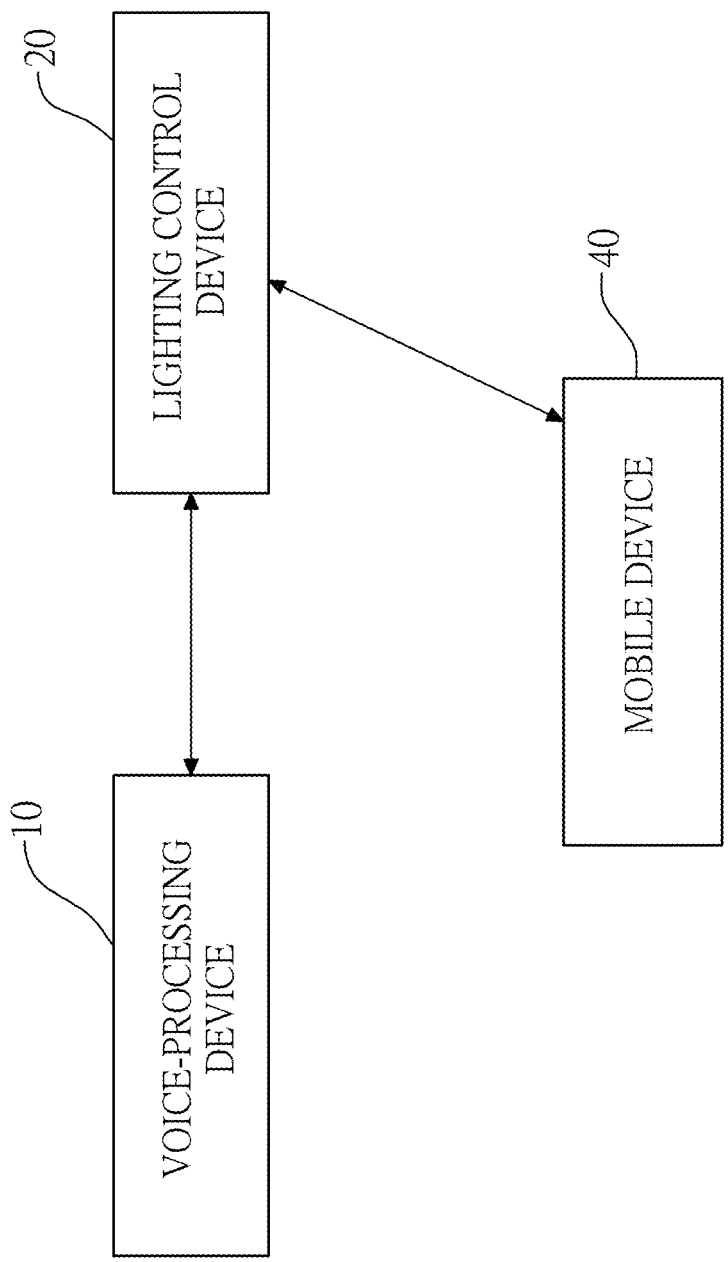
FIG. 4 is a functional block diagram of a third embodiment of a voice-controlled lighting control system in accordance with the present invention.

With reference to FIG. 4, a third embodiment of a voice-controlled lighting control system in accordance with the present invention is substantially the same as the second embodiment except that the present embodiment includes at least one mobile device 40. Each one of the at least one mobile device 40 has voice recognition software built therein and stores the multiple voice fingerprints and the multiple error-tolerant voice fingerprints, such that users can perform voice-controlled operation through the voice recognition software of the mobile device 40 to instruct the lighting control device 20 to drive the lighting module 30 for a lighting operation.

In sum, the voice-processing device 10 or the mobile device 40 receives the voice command uttered from users and compares the received voice command with the voice fingerprints and the error-tolerant voice fingerprints stored in the memory unit 14 to identify a corresponding voice fingerprint in the memory unit 14, and remotely controls the lighting control device 20 to instruct the lighting module 30 to perform a corresponding lighting operation. Given the double voice recognition, the precision of recognizing voice command can be enhanced and the voice control over luminance and lighting modes of the lighting module 30 can be attained.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A voice-controlled lighting control system, comprising:
 a voice-processing device having:
  a memory unit initially built in with multiple voice fingerprints and multiple error-tolerant voice fingerprints, wherein each voice fingerprint corresponds to one of the multiple error-tolerant voice fingerprints;
  a first communication unit;
  a first power module;
  a voice-receiving module; and
  a first processor connected to the first power module, the voice-receiving module, the memory unit and the first communication unit;
 a lighting control device having:
  a second communication unit connected to and communicating with the first communication unit;
  a second power module;
  a driving module; and
  a second processor connected to the second power module, the driving module and the second communication unit; and
 a lighting module connected to the driving module of the lighting control device;
 wherein
 the voice-receiving module of the voice-processing device receives a voice command, the first processor compares the received voice command with the voice fingerprints stored in the memory unit, when the received voice command falls within a biometric match threshold of one of the voice fingerprints stored in the memory unit, the first processor sends a corresponding control signal to the second communication unit of the lighting control device through the first communication unit, the second processor of the lighting control device sends a corresponding driving signal according to the corresponding control signal to the driving module, and the driving module drives the lighting module to operate according to the corresponding driving signal, and when the voice command does not fall within the biometric match threshold of any of the voice fingerprints stored in the memory unit, the first processor compares the received voice command with the error-tolerant voice fingerprints stored in the memory unit, and when the received voice command falls within a biometric match threshold of one of the error-tolerant voice fingerprints, the first processor sends a corresponding control signal to the second communication unit of the lighting control device through the first communication unit, the second processor of the lighting control device sends a corresponding driving signal according to the control signal to the driving module, and the driving module drives the lighting module to operate according to the driving signal, wherein the biometric match threshold of each error-tolerant voice fingerprint is greater than the biometric match threshold of a corresponding voice fingerprint stored in the memory unit.

2. The voice-controlled lighting control system as claimed in claim 1, wherein the voice-processing device further has a display unit connected to the first processor.

3. The voice-controlled lighting control system as claimed in claim 2, wherein when receiving power supplied from the first power module, the first processor sends a standby state prompting signal to the display unit for the display unit to display a notification that the voice-processing device is staying at a standby state.

4. The voice-controlled lighting control system as claimed in claim 3, wherein when comparing the received voice command with the voice fingerprints or the error-tolerant voice fingerprints, the first processor sends a busy signal to the display unit to display a notification that the voice-processing device is recognizing the received voice command.

5. The voice-controlled lighting control system as claimed in claim 4, wherein the first power module of the voice-processing device has:
   a first power unit; and
   a first voltage regulation unit electrically connected to the first power unit and the first processor.

6. The voice-controlled lighting control system as claimed in claim 4, wherein the driving module of the lighting control device has:
   a driving unit connected to the second processor; and
   a signal output port electrically connected to the lighting module.

7. The voice-controlled lighting control system as claimed in claim 4, wherein the second power module of the lighting control device has:
   a power conversion unit; and
   a second voltage regulation unit electrically connected to the power conversion unit and the second processor.

8. The voice-controlled lighting control system as claimed in claim 1, wherein when the first processor compares the received voice command with the error-tolerant voice fingerprints stored in the memory unit and finding that the received command falls within the biometric match threshold of a corresponding error-tolerant voice fingerprint, the first processor replaces the voice fingerprint with the corresponding error-tolerant voice fingerprint.

9. The voice-controlled lighting control system as claimed in claim 2, wherein when the first processor compares the received voice command with the error-tolerant voice fingerprints stored in the memory unit and finding that the received command falls within the biometric match threshold of a corresponding error-tolerant voice fingerprint, the first processor replaces the voice fingerprint with the corresponding error-tolerant voice fingerprint.

10. The voice-controlled lighting control system as claimed in claim 3, wherein when the first processor compares the received voice command with the error-tolerant voice fingerprints stored in the memory unit and finding that the received command falls within the biometric match threshold of a corresponding error-tolerant voice fingerprint, the first processor replaces the voice fingerprint with the corresponding error-tolerant voice fingerprint.

11. The voice-controlled lighting control system as claimed in claim 4, wherein when the first processor compares the received voice command with the error-tolerant voice fingerprints stored in the memory unit and finding that the received command falls within the biometric match threshold of a corresponding error-tolerant voice fingerprint, the first processor replaces the voice fingerprint with the corresponding error-tolerant voice fingerprint.

12. The voice-controlled lighting control system as claimed in claim 5, wherein when the first processor compares the received voice command with the error-tolerant voice fingerprints stored in the memory unit and finding that the received command falls within the biometric match threshold of a corresponding error-tolerant voice fingerprint, the first processor replaces the voice fingerprint with the corresponding error-tolerant voice fingerprint.

13. The voice-controlled lighting control system as claimed in claim 6, wherein when the first processor compares the received voice command with the error-tolerant voice fingerprints stored in the memory unit and finding that the received command falls within the biometric match threshold of a corresponding error-tolerant voice fingerprint, the first processor replaces the voice fingerprint with the corresponding error-tolerant voice fingerprint.

14. The voice-controlled lighting control system as claimed in claim 7, wherein when the first processor compares the received voice command with the error-tolerant voice fingerprints stored in the memory unit and finding that the received command falls within the biometric match threshold of a corresponding error-tolerant voice fingerprint, the first processor replaces the voice fingerprint with the corresponding error-tolerant voice fingerprint.

15. The voice-controlled lighting control system as claimed in claim 8, wherein the voice-processing device further has a reset unit connected to the first processor, wherein when receiving a reset signal from the reset unit, the first processor restores the voice fingerprint replaced by the corresponding error-tolerant voice fingerprint to the voice fingerprint initially built in the memory unit.

16. The voice-controlled lighting control system as claimed in claim 9, wherein the voice-processing device further has a reset unit connected to the first processor, wherein when receiving a reset signal from the reset unit, the first processor restores the voice fingerprint replaced by the corresponding error-tolerant voice fingerprint to the voice fingerprint initially built in the memory unit.

17. The voice-controlled lighting control system as claimed in claim 10, wherein the voice-processing device further has a reset unit connected to the first processor, wherein when receiving a reset signal from the reset unit, the first processor restores the voice fingerprint replaced by the corresponding error-tolerant voice fingerprint to the voice fingerprint initially built in the memory unit.

18. The voice-controlled lighting control system as claimed in claim 11, wherein the voice-processing device further has a reset unit connected to the first processor, wherein when receiving a reset signal from the reset unit, the first processor restores the voice fingerprint replaced by the corresponding error-tolerant voice fingerprint to the voice fingerprint initially built in the memory unit.

19. The voice-controlled lighting control system as claimed in claim 12, wherein the voice-processing device further has a reset unit connected to the first processor, wherein when receiving a reset signal from the reset unit, the first processor restores the voice fingerprint replaced by the corresponding error-tolerant voice fingerprint to the voice fingerprint initially built in the memory unit.

20. The voice-controlled lighting control system as claimed in claim 13, wherein the voice-processing device further has a reset unit connected to the first processor, wherein when receiving a reset signal from the reset unit, the first processor restores the voice fingerprint replaced by the corresponding error-tolerant voice fingerprint to the voice fingerprint initially built in the memory unit.

21. The voice-controlled lighting control system as claimed in claim 14, wherein the voice-processing device further has a reset unit connected to the first processor, wherein when receiving a reset signal from the reset unit, the first processor restores the voice fingerprint replaced by the corresponding error-tolerant voice fingerprint to the voice fingerprint initially built in the memory unit.

22. The voice-controlled lighting control system as claimed in claim 15, further comprising a mobile device, wherein the mobile device is connected to the lighting control device, is built in with voice recognition software, and stores the multiple voice fingerprints and the multiple error-tolerant voice fingerprints for the mobile device to receive the voice command, uses the voice recognition software to compare and recognize the voice command, and sends a corresponding control signal to the lighting control device to instruct the lighting module to operate.

23. The voice-controlled lighting control system as claimed in claim 16, further comprising a mobile device, wherein the mobile device is connected to the lighting control device, is built in with voice recognition software, and stores the multiple voice fingerprints and the multiple error-tolerant voice fingerprints for the mobile device to receive the voice command, uses the voice recognition software to compare and recognize the voice command, and sends a corresponding control signal to the lighting control device to instruct the lighting module to operate.

24. The voice-controlled lighting control system as claimed in claim 17, further comprising a mobile device, wherein the mobile device is connected to the lighting control device, is built in with voice recognition software, and stores the multiple voice fingerprints and the multiple error-tolerant voice fingerprints for the mobile device to receive the voice command, uses the voice recognition software to compare and recognize the voice command, and sends a corresponding control signal to the lighting control device to instruct the lighting module to operate.

25. The voice-controlled lighting control system as claimed in claim 18, further comprising a mobile device, wherein the mobile device is connected to the lighting control device, is built in with voice recognition software, and stores the multiple voice fingerprints and the multiple error-tolerant voice fingerprints for the mobile device to receive the voice command, uses the voice recognition software to compare and recognize the voice command, and sends a corresponding control signal to the lighting control device to instruct the lighting module to operate.

26. The voice-controlled lighting control system as claimed in claim 19, further comprising a mobile device, wherein the mobile device is connected to the lighting control device, is built in with voice recognition software, and stores the multiple voice fingerprints and the multiple error-tolerant voice fingerprints for the mobile device to receive the voice command, uses the voice recognition software to compare and recognize the voice command, and sends a corresponding control signal to the lighting control device to instruct the lighting module to operate.

27. The voice-controlled lighting control system as claimed in claim 20, further comprising a mobile device, wherein the mobile device is connected to the lighting control device, is built in with voice recognition software, and stores the multiple voice fingerprints and the multiple error-tolerant voice fingerprints for the mobile device to receive the voice command, uses the voice recognition software to compare and recognize the voice command, and sends a corresponding control signal to the lighting control device to instruct the lighting module to operate.

28. The voice-controlled lighting control system as claimed in claim 21, further comprising a mobile device, wherein the mobile device is connected to the lighting control device, is built in with voice recognition software, and stores the multiple voice fingerprints and the multiple error-tolerant voice fingerprints for the mobile device to receive the voice command, uses the voice recognition software to compare and recognize the voice command, and sends a corresponding control signal to the lighting control device to instruct the lighting module to operate.

* * * * *